(12) United States Patent
Imazeki (10) Patent No.: US 12,454,324 B2
(45) Date of Patent: Oct. 28, 2025

(54) STRADDLED VEHICLE

(71) Applicant: YAMAHA HATSUDOKI KABUSHIKI KAISHA, Iwata (JP)

(72) Inventor: Souichirou Imazeki, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 914 days.

(21) Appl. No.: 17/562,195

(22) Filed: Dec. 27, 2021

(65) Prior Publication Data

US 2022/0204104 A1 Jun. 30, 2022

(30) Foreign Application Priority Data

Dec. 29, 2020 (JP) ................................ 2020-219792

(51) Int. Cl.
*B62K 25/30* (2006.01)
*B62J 6/026* (2020.01)
(Continued)

(52) U.S. Cl.
CPC ............... *B62J 6/026* (2020.02); *B62J 17/02* (2013.01); *B62J 17/10* (2020.02); *B62J 45/20* (2020.02)

(58) Field of Classification Search
CPC ........ B62K 19/46; B60Q 1/0041; B62J 25/02; B62J 17/04; B62J 17/00; B62J 6/026;
(Continued)

(56) References Cited

U.S. PATENT DOCUMENTS 8,454,075 B2 * 6/2013 Hayashi ............... B60Q 1/0041
296/78.1
8,602,150 B2 * 12/2013 Petersson ................. B62J 17/04
180/68.1
(Continued)

FOREIGN PATENT DOCUMENTS

EP 2336012 A1 * 6/2011 ........... B60Q 1/0041
EP 3118094 A1 * 1/2017 ............. B62J 17/00
(Continued)

OTHER PUBLICATIONS

Koji Takara, Saddle Riding Type Vehicle, May 16, 2016, EPO, JP 2016-078497 A, Machine Translation of Description (Year: 2016).*

*Primary Examiner* — Alentin Neacsu
*Assistant Examiner* — Nabin Kumar Sharma
(74) *Attorney, Agent, or Firm* — Rabin & Berdo, P.C.

(57) ABSTRACT

A straddled vehicle including a body frame having a head pipe, a front cover disposed in front of the head pipe and having an opening at a middle of the straddled vehicle in a width direction, a duct disposed in front of the head pipe and extending rearward from the opening to form a traveling wind pathway for traveling wind flowing from ahead and taken in through the opening, a headlight of a single light configuration, which overlaps the head pipe in a front view of the straddled vehicle, and is disposed inside the duct at the middle of the straddled vehicle in the width direction and further rearward than the opening, and an aero-stabilizing member disposed inside the duct and laterally covering the headlight, the aero-stabilizing member being configured to direct the traveling wind flowing from ahead to flow away from the head pipe in the width direction.

12 Claims, 7 Drawing Sheets

(51) Int. Cl.
  *B62J 17/02* (2006.01)
  *B62J 17/10* (2020.01)
  *B62J 45/20* (2020.01)
  *B62K 3/02* (2006.01)
  *B62K 25/04* (2006.01)

(58) Field of Classification Search
  CPC ... B62J 45/20; B62J 17/10; B62J 17/02; B62J 6/03; F02M 35/162; B62Q 1/28
  USPC ...................................................... 280/281.1
  See application file for complete search history.

(56) References Cited

U.S. PATENT DOCUMENTS

| | | | |
|---|---|---|---|
| 9,334,005 B2 * | 5/2016 | Horiuchi | B62K 19/46 |
| 10,106,219 B2 * | 10/2018 | Takakuwa | F02M 35/162 |
| 11,958,561 B2 * | 4/2024 | Imazeki | B62J 17/10 |
| 2011/0317441 A1 * | 12/2011 | Yasuhara | B60Q 1/28 |
| | | | 362/459 |
| 2014/0202782 A1 * | 7/2014 | Tsukui | B62J 25/02 |
| | | | 362/475 |
| 2017/0015382 A1 * | 1/2017 | Takakuwa | F02M 35/162 |
| 2018/0162265 A1 * | 6/2018 | Iwamoto | B62J 6/026 |
| 2022/0204108 A1 * | 6/2022 | Imazeki | B62J 17/10 |
| 2024/0425132 A1 * | 12/2024 | Ishii | B62J 11/19 |

FOREIGN PATENT DOCUMENTS

| | | | | |
|---|---|---|---|---|
| JP | 2010208470 A * | 9/2010 | | B62J 17/00 |
| JP | 5831973 B2 | 12/2015 | | |
| JP | 2016078497 A * | 5/2016 | | B62J 11/19 |

* cited by examiner

STRADDLED VEHICLE

CROSS-REFERENCE TO RELATED APPLICATIONS

This application is based on, and claims priority from, Japanese Patent Application No. 2020-219792, filed on Dec. 29, 2020. The contents of the application is incorporated herein by reference.

BACKGROUND

Field of the Invention

The present invention relates to a straddled vehicle.

Background Information

In a type of straddled vehicle well-known so far, a front cover is provided with an opening for taking in traveling wind flowing from ahead of the vehicle. For example, Publication of Japan Patent No. 5831973 discloses a straddled vehicle, in which the traveling wind is led to flow rearward from a duct connected to the opening. A pair of headlights is herein disposed inside the duct, while being aligned right and left.

SUMMARY

In the straddled vehicle disclosed in Publication of Japan Patent No. 5831973, the pair of headlights is disposed on a more front side than a portion of the opening. Hence, the traveling wind, taken in through the opening, is undesirably blocked by the pair of headlights. In view of this, it can be assumed to dispose the pair of headlights on a more rear side than the opening. However, this assumption results in drawbacks such as increase in leakage of light emitted from the pair of headlights and degradation in visibility due to an undesirable state that the interior of the duct is intensely illuminated in part.

It is an object of the present invention to enable a straddled vehicle, in which a headlight is disposed inside a duct, to easily take in traveling wind flowing from ahead of the vehicle into the duct and inhibit increase in leakage of light emitted from the headlight.

A straddled vehicle according to an aspect of the present invention includes a vehicle body frame, a front cover, a duct, a headlight, and an aero-stabilizing member. The vehicle body frame includes a head pipe. The front cover is disposed in front of the head pipe. The duct is disposed in front of the head pipe. The duct includes an opening and a traveling wind pathway. The opening is provided in the front cover so as to be disposed in a middle of the vehicle in a vehicle width direction and takes in traveling wind flowing from ahead. The traveling wind pathway extends rearward from the opening. The headlight employs a single light configuration. The headlight overlaps the head pipe in a vehicle front view and is disposed inside the duct and on a more rear side than the opening in the middle of the vehicle in the vehicle width direction. The aero-stabilizing member is disposed in adjacent to the headlight so as to laterally cover the headlight from right and left and stabilizes the traveling wind, flowing from ahead, to flow away from the head pipe in the vehicle width direction.

In the straddled vehicle according to the present aspect, the headlight is disposed inside the duct and on a more rear side than the opening configured to take in the traveling wind, flowing from ahead, into the duct. Because of this, the traveling wind, flowing from ahead, becomes more likely to be taken in through the opening into the duct than a configuration that the headlight is disposed inside the duct and on a more front side than at least a portion of the opening. Besides, the traveling wind, passing through the duct, is stabilized to be directed to detour the head pipe by the aero-stabilizing member. Hence, the traveling wind, flowing from ahead, can be efficiently led to flow rearward. Moreover, the aero-stabilizing member is disposed in adjacent to the headlight so as to laterally cover the headlight from right and left. Hence, increase in leakage of light emitted from the headlight can be inhibited by the aero-stabilizing member. Furthermore, the headlight herein used employs a single light configuration. Hence, adjustment in direction and intensity of light is made more easily by the single headlight than by a pair of right and left headlights.

The headlight may include a headlight bulb and a lens covering the headlight from front. The aero-stabilizing member may include a bottom wall portion disposed directly below the headlight. The bottom portion may overlap the lens in a plan view of the straddled vehicle. In this case, the bottom wall portion can inhibit the headlight from illuminating the lower surface of the duct with too much intensity.

The aero-stabilizing member may be disposed on a more rear side than the opening. In this case, the traveling wind, flowing from ahead, becomes more likely to be taken in through the opening than a configuration that the aero-stabilizing member is disposed on a more front side than at least a portion of the opening.

The aero-stabilizing member may include a left wall portion and a right wall portion. The left wall portion laterally covers the headlight from left, whereas the right wall portion laterally covers the headlight from right. The left and right wall portions may be each located closer to the middle of the vehicle in the vehicle width direction at a front end thereof than at a rear end thereof in a vehicle front view. In this case, the aero-stabilizing member stabilizes the traveling wind, flowing from ahead, to become likely to be directed to detour the head pipe.

The aero-stabilizing member may include a top wall portion disposed directly above the headlight. The top wall portion may protrude at a front end thereof to a more front side than the headlight. In this case, the top wall portion can inhibit the headlight from illuminating upward with too much intensity.

The aero-stabilizing member may be supported by the vehicle body frame so as to be integrally movable with the headlight. In this case, a work of moving the aero-stabilizing member can be omitted in optical axis adjustment.

The aero-stabilizing member and the headlight may be disposed apart from a lower surface of the duct and an upper surface of the duct at gaps in the vehicle up-and-down direction. In this case, it is possible to reliably produce a space for optical axis adjustment. Besides, the traveling wind flows rearward as well from above and below the headlight or the aero-stabilizing member. Hence, the headlight or members disposed in the surroundings thereof can be cooled by the traveling wind.

The straddled vehicle may further include a pair of position lights. The pair of position lights may be supported by the front cover. The pair of position lights may be disposed more apart from the middle of the vehicle in the vehicle width direction than the opening. The pair of position lights may be arranged side by side with the headlight in a right-and-left direction in the vehicle front view. In this case, the pair of position lights is enhanced in flexibility of layout.

The pair of position lights is each shaped to be elongated in approximately a horizontal direction in the vehicle front view. In this case, the pair of position lights is enhanced in visibility.

DETAILED DESCRIPTION OF EMBODIMENTS

A preferred embodiment of a straddled vehicle according to an aspect of the present invention will be hereinafter explained with reference to drawings. It should be noted that in the following explanation, terms indicating such directions as "back and forth", "up and down", and "right and left" are explained based on directions seen from a rider in operation of the straddled vehicle. Therefore, a right-and-left direction is synonymous with a vehicle width direction. Besides, the term "outer side in a vehicle width direction" means a side far from the center of the straddled vehicle in the vehicle width direction. By contrast, the term "inner side in the vehicle width direction" means a side near to the center of the straddled vehicle in the vehicle width direction.

Figure 1:
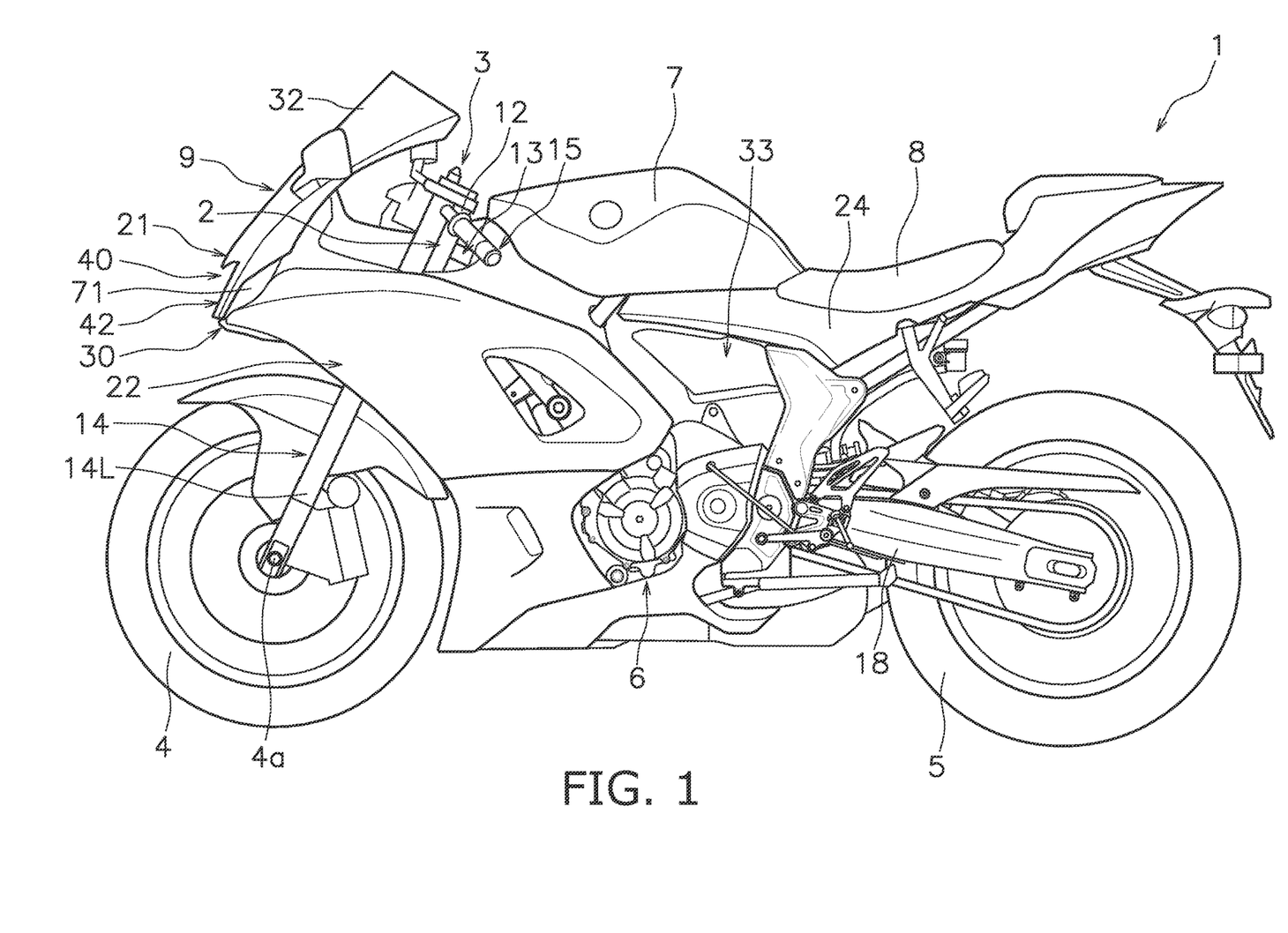
FIG. 1 is a left side view of a straddled vehicle.

FIG. 1 is a left side view of a straddled vehicle 1. The straddled vehicle 1 includes a vehicle body frame 2, a steering device 3, a front wheel 4, a rear wheel 5, an engine 6, a fuel tank 7, a seat 8, and a vehicle body cover 9.

The vehicle body frame 2 includes a head pipe 12 and a main frame 13. The head pipe 12 extends forward and downward from the upper end thereof to the lower end thereof in a vehicle side view. The head pipe 12 is disposed in the middle of the vehicle in the vehicle width direction.

The main frame 13 is connected to the head pipe 12 and extends therefrom rearward. It should be noted that the term "connection" is not limited to direct connection and encompasses indirect connection. Besides, the term "connection" is not limited to a condition that separate members are fixed to each other and encompasses a condition that a plurality of portions in an integrated member continue to each other.

Figure 2:
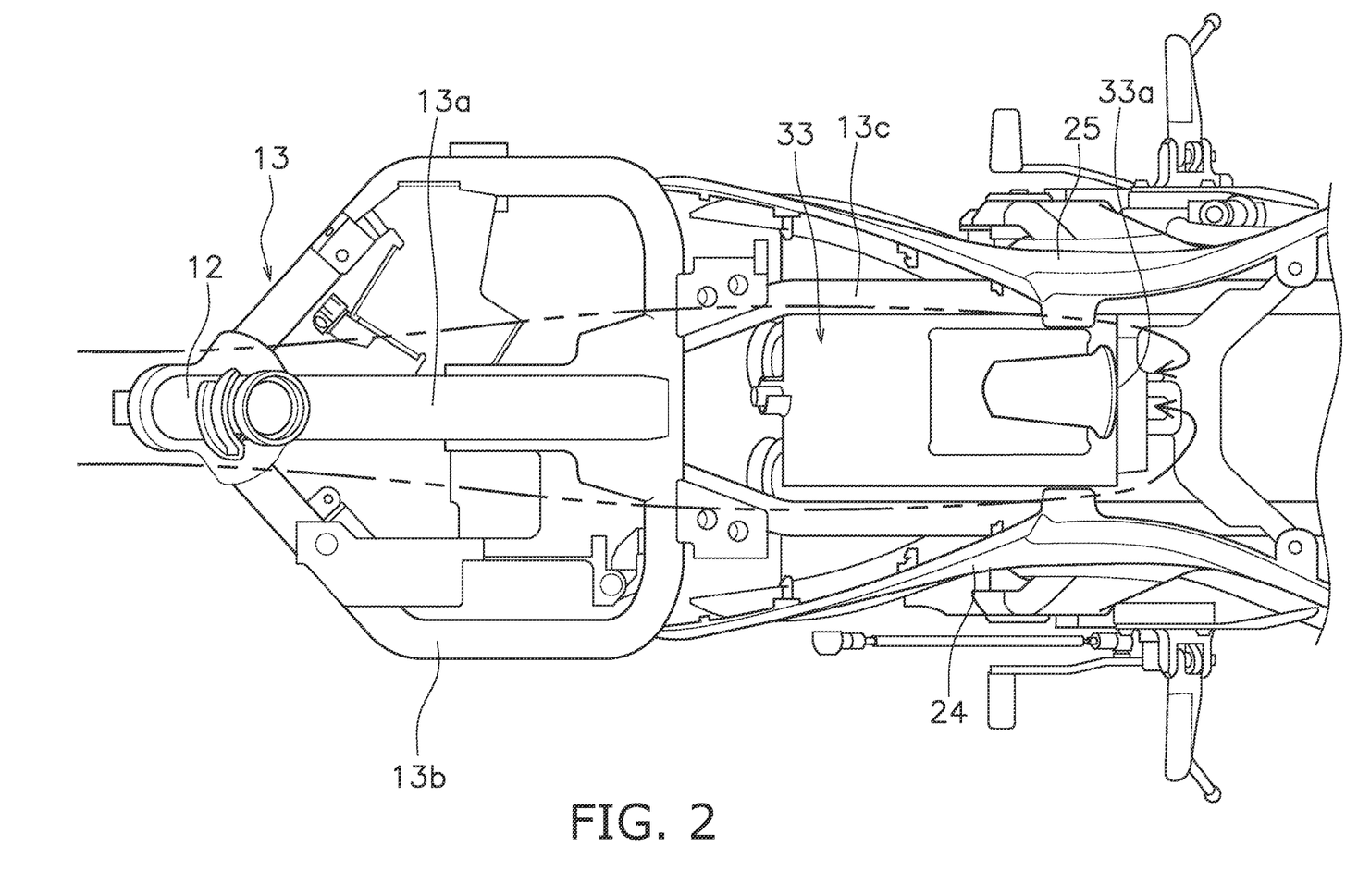
FIG. 2 is a view of a vehicle body frame and the surroundings thereof as seen from above.

FIG. 2 is a view of the vehicle body frame 2 and the surroundings thereof as seen from above. FIG. 2 omits illustration of the engine 6, the fuel tank 7, the seat 8, and so forth. The main frame 13 includes a tank support frame 13a, an engine support frame 13b, and a rear frame 13c.

The tank support frame 13a extends rearward from the head pipe 12. The tank support frame 13a is disposed directly below the fuel tank 7 in the middle of the vehicle in the vehicle width direction and supports the fuel tank 7. The engine support frame 13b is disposed on a lower side than the tank support frame 13a. The engine support frame 13b extends rearward from the head pipe 12, while branching therefrom right and left. The engine support frame 13b is connected at the branched rear ends thereof to the rear end of the tank support frame 13a. The rear frame 13c extends rearward from the rear end of the tank support frame 13a, while branching therefrom right and left.

Figure 3:
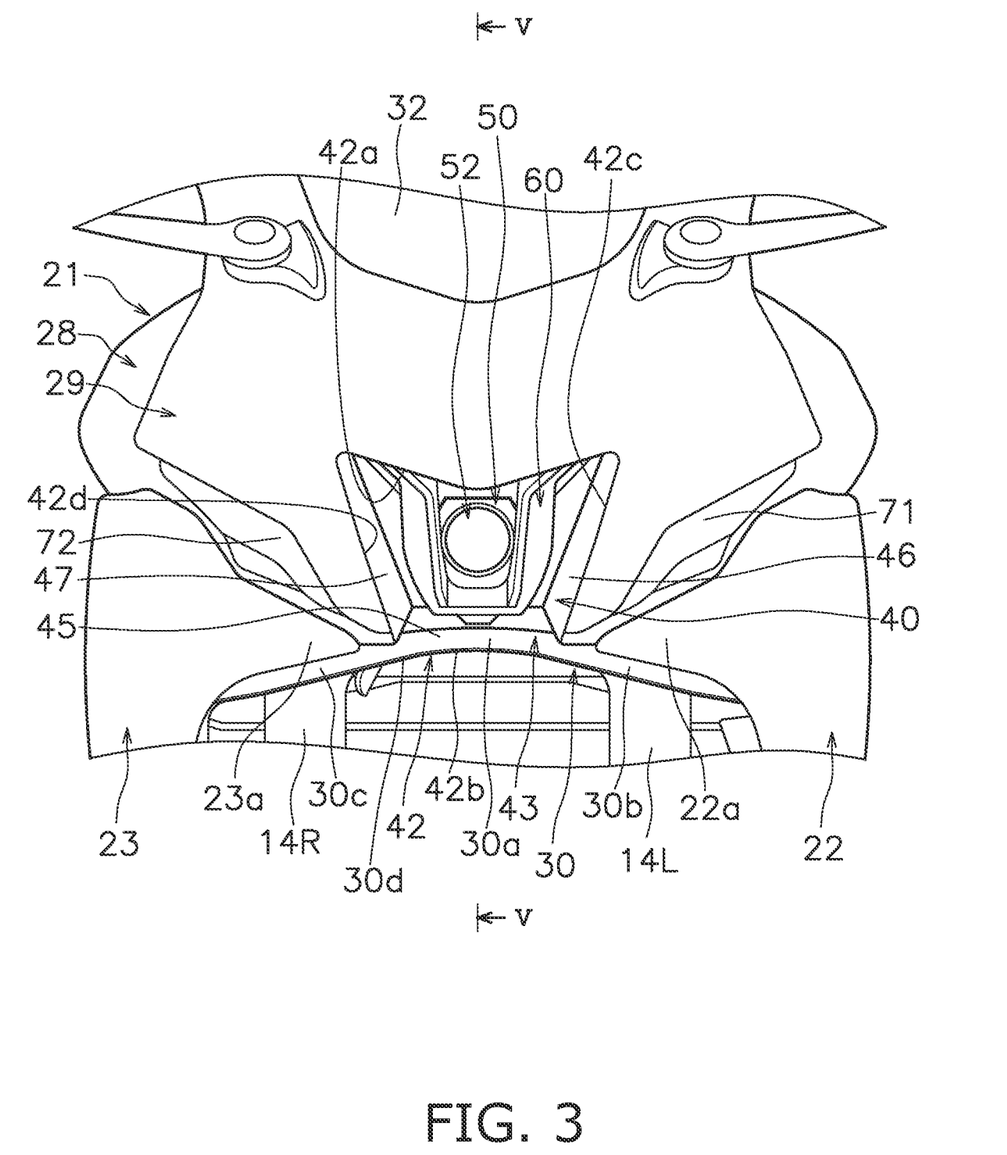
FIG. 3 is a partial front view of the straddled vehicle.

The steering device 3 includes a front fork 14 and a handle portion 15. The front fork 14 is supported by the head pipe 12 so as to be turnable. FIG. 3 is a partial front view of the straddled vehicle 1. The front fork 14 includes a pair of right and left front suspensions 14R and 14L. The pair of right and left front suspensions 14R and 14L extends forward and downward from the upper ends thereof to the lower ends thereof in the vehicle side view. The handle portion 15 is fixed to an upper portion of the front fork 14.

The front wheel 4 is supported by the front fork 14 so as to be rotatable. The front wheel 4 is coupled to the lower ends of the pair of right and left front suspensions 14R and 14L. The rear wheel 5 is supported by a swing arm 18 disposed behind the engine 6 so as to be rotatable.

The engine 6 is supported by the vehicle body frame 2. The engine 6 is attached to the engine support frame 13b of the main frame 13. The engine 6 is disposed directly below the fuel tank 7.

The fuel tank 7 is disposed behind the head pipe 12. The fuel tank 7 is disposed directly above the tank support frame 13a and the rear frame 13c.

The seat 8 is disposed behind the fuel tank 7. The seat 8 is disposed directly above the rear frame 13c and is supported by the rear frame 13c.

FIG. 3 is a partial front view of the straddled vehicle 1. As shown in FIGS. 1 to 3, the vehicle body cover 9 includes a front cover 21, front side covers 22 and 23, and rear side covers 24 and 25.

The front cover 21 is disposed in front of the head pipe 12. The front cover 21 is disposed in the middle of the vehicle in the vehicle width direction.

Figure 4:
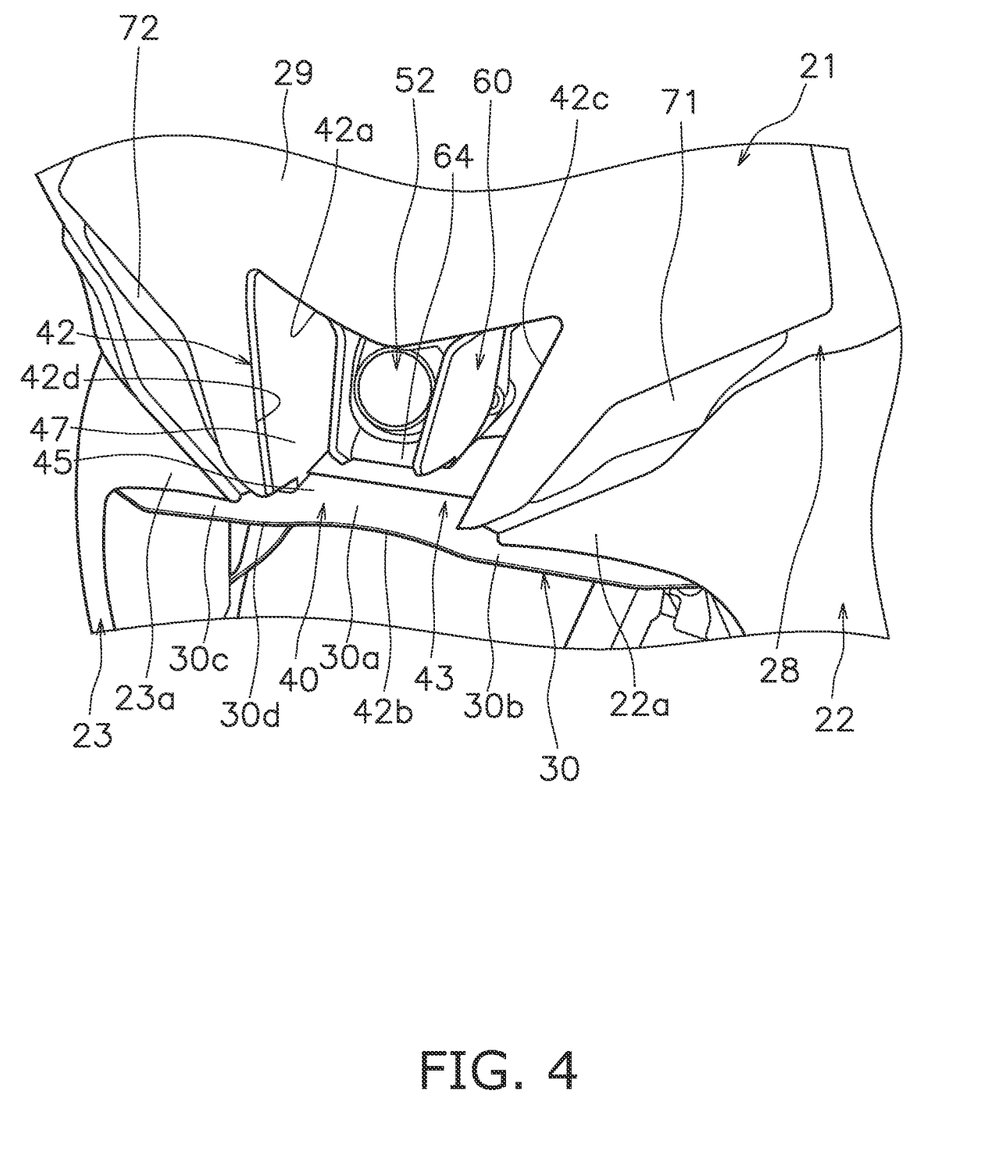
FIG. 4 is a perspective view of a front cover and the surroundings thereof.
Figure 5:
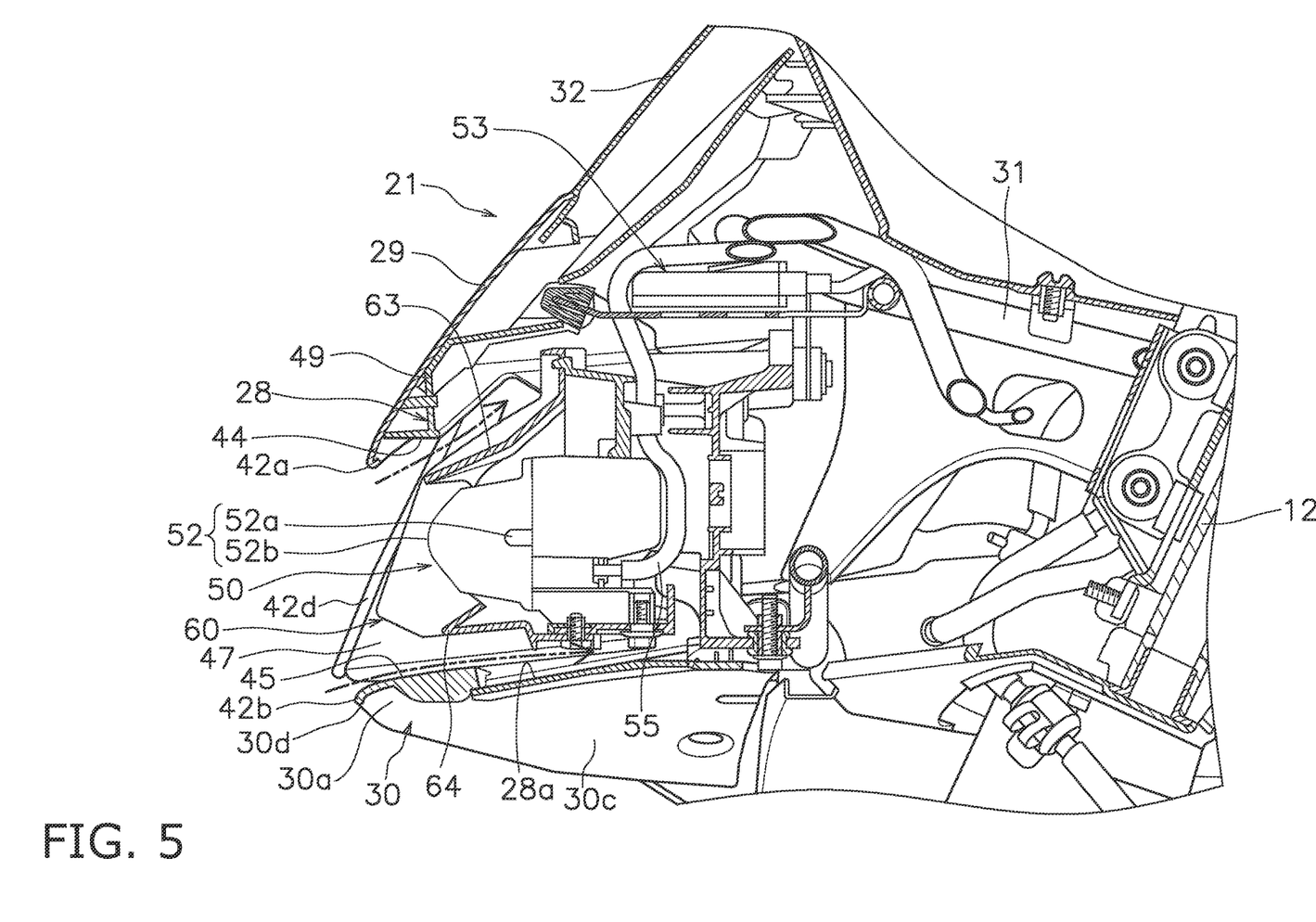
FIG. 5 is a cross-sectional view taken along line V-V in FIG. 3.

FIG. 4 is a perspective view of the front cover 21 and the surroundings thereof. FIG. 5 is a cross-sectional view taken along line V-V in FIG. 3. As shown in FIGS. 3 to 5, the front cover 21 includes a cover body 28, an outer cover 29, and an aero-stabilizing plate 30. As shown in FIG. 5, the cover body 28 is supported by a stay 31 extending forward from the head pipe 12. The outer cover 29 is disposed in front of the cover body 28. The outer cover 29 is fixed to the cover body 28 so as to cover a portion of the cover body 28 from front. A wind shield 32 is attached to an upper portion of the outer cover 29.

The aero-stabilizing plate 30 generates a downforce by utilizing the traveling wind flowing from ahead. The aero-stabilizing plate 30 is disposed directly below the front cover 21. The aero-stabilizing plate 30 is attached to a lower portion of the cover body 28 of the front cover 21. The aero-stabilizing plate 30 has an approximately semi-circular shape and the front side thereof has a circular-arc shape. The aero-stabilizing plate 30 extends to more outer sides than the pair of right and left front suspensions 14R and 14L in the vehicle width direction.

The aero-stabilizing plate 30 includes a middle portion 30a, a left lateral portion 30b, a right lateral portion 30c, and a front edge 30d. The middle portion 30a is disposed in the middle of the vehicle in the vehicle width direction. The middle portion 30a is disposed in a lower portion of the distal end of the cover body 28 and the outer cover 29. The middle portion 30a protrudes to a more front side than the left and right lateral portions 30b and 30c. The middle portion 30a is disposed on an upper side than the left and right lateral portions 30b and 30c. The left lateral portion 30b extends leftward from the middle portion 30a. The right lateral portion 30c is shaped to be bilaterally symmetric to the left lateral portion 30b and extends rightward from the middle portion 30a. Each left/right lateral portion 30b, 30c is disposed apart from the cover body 28 and the outer cover 29 at a gap in the up-and-down direction. The front edge 30d has a shape slanted forward and downward.

The front side cover 22 is disposed on the left side of the middle of the vehicle in the vehicle width direction. The front side cover 22 laterally covers a portion of the front fork 14 from left. The front side cover 22 extends to a position located directly below the fuel tank 7 in the vehicle side view. The front side cover 22 includes a front end 22a. The front end 22a extends in the vehicle width direction in a vehicle front view. The front end 22a is disposed directly below the outer cover 29 and is fixed to the cover body 28 so as to cover a left lower portion of the cover body 28 from front. The front end 22a is disposed apart from the left lateral portion 30b of the aero-stabilizing plate 30 at a gap in the up-and-down direction.

The front side cover 23 is shaped to be bilaterally symmetric to the front side cover 22. The front side cover 23 is disposed on the right side of the middle of the vehicle in the vehicle width direction. The front side cover 23 laterally covers a portion of the front fork 14 from right. The front side cover 23 includes a front end 23a. The front end 23a is fixed to the cover body 28 so as to cover a right lower portion of the cover body 28 from front. The front end 23a is disposed apart from the right lateral portion 30c of the aero-stabilizing plate 30 at a gap in the up-and-down direction.

As shown in FIG. 1, the rear side cover 24 is disposed behind the front side cover 22. The rear side cover 24 is disposed directly below the fuel tank 7 and the seat 8 in the vehicle side view. The rear side cover 24 laterally covers the rear frame 13c from left.

The rear side cover 25 is shaped to be bilaterally symmetric to the rear side cover 24. The rear side cover 24 laterally covers the rear frame 13c from right.

The straddled vehicle 1 further includes an air cleaner 33. The air cleaner 33 is disposed behind the front side cover 22 in the vehicle side view. The air cleaner 33 is disposed directly below the rear side cover 24 in the vehicle side view.

The air cleaner 33 is disposed directly below the fuel tank 7 and the rear frame 13c. The air cleaner 33 is connected to the engine 6. The air cleaner 33 includes an air intake port 33a opened rearward. The air intake port 33a is disposed behind the tank support frame 13a.

The straddled vehicle 1 further includes a duct 40, a headlight unit 50, an aero-stabilizing member 60, and position lights 71 and 72. The position lights 71 and 72 are provided as an exemplary pair of position lights.

The duct 40 is disposed in front of the head pipe 12. The duct 40 is disposed in the middle of the vehicle in the vehicle width direction and extends in the back-and-forth direction in the vehicle side view. The duct 40 includes an opening 42 and a traveling wind pathway 43. The opening 42 takes in traveling wind flowing from ahead. The opening 42 is provided in the distal end of the front cover 21 in the middle of the vehicle in the vehicle width direction. The opening 42 is opened forward. The opening 42 is disposed on a more front side than an axle 4a of the front wheel 4.

The opening 42 has an approximately isosceles trapezoidal shape in the vehicle front view. The opening 42 includes an upper end 42a, a lower end 42b, a left lateral end 42c, and a right lateral end 42d. The upper end 42a has a shape slanted forward and downward. As shown in FIG. 3, the upper end 42a extends in approximately the right-and-left direction. The upper end 42a slants down to the inner side in the vehicle width direction in the vehicle front view. The upper end 42a is shaped such that a middle portion thereof protrudes down. In the upper end 42a, the middle portion thereof is disposed on a more front side than both ends thereof.

The lower end 42b extends in the right-and-left direction. As shown in FIG. 5, the lower end 42b is disposed on a more front side than the upper end 42a. The left and right lateral ends 42c and 42d extend in approximately the up-and-down direction. In each left/right lateral end 42c, 42d, a lower portion thereof is disposed on a more front side than an upper portion thereof and is also disposed on a more inner side than the upper portion thereof in the vehicle width direction. The lower portion of each left/right lateral end 42c, 42d is disposed on a more front side than the upper end 42a. It should be noted that in the present preferred embodiment, the upper end 42a, the left lateral end 42c, and the right lateral end 42d are formed on the outer cover 29 of the front cover 21, and the lower end 42b is composed of the front edge 30d that is included in the middle portion 30a of the aero-stabilizing plate 30 of the front cover 21.

The traveling wind pathway 43 extends rearward from the opening 42 and is opened rearward. In the present preferred embodiment, the traveling wind pathway 43 is composed of a portion of the aero-stabilizing plate 30 and the cover body 28 of the front cover 21. The traveling wind pathway 43 is shaped to adjoin the opening 42. Because of this, the traveling wind, flowing from ahead of the vehicle, is taken in through the opening 42 and is led to rear of the vehicle through the traveling wind pathway 43.

The duct 40 includes an upper surface 44, a lower surface 45, a left lateral surface 46, and a right lateral surface 47. The upper surface 44, the lower surface 45, the left lateral surface 46, and the right lateral surface 47 compose the traveling wind pathway 43. In the present preferred embodiment, the upper surface 44, the left lateral surface 46, and the right lateral surface 47 are formed on the cover body 28, and the lower surface 45 is formed on the middle portion 30a of the aero-stabilizing plate 30 and the cover body 28.

As shown in FIG. 5, the upper surface 44 is disposed on an upper side than the upper end 42a of the opening 42. The lower surface 45 is composed of an upper surface of the middle portion 30a of the aero-stabilizing plate 30 and a bottom surface 28a of the cover body 28. The bottom surface 28a is disposed behind the upper surface of the middle portion 30a of the aero-stabilizing plate 30. The front end of the lower surface 45 is provided as the lower end 42b of the opening 42 and is disposed on a more front side than the front end of the upper surface 44. The left and right lateral surfaces 46 and 47 extend to a more front side than the upper surface 44. In each left/right lateral surface 46, 47, a lower portion thereof is disposed on a more inner side than an upper portion thereof in the vehicle width direction. In each left/right lateral surface 46, 47, a rear portion thereof is disposed on a more inner side than a front portion thereof in the vehicle width direction.

As shown in FIG. 5, the duct 40 further includes a protruding portion 49. The protruding portion 49 protrudes upward from the traveling wind pathway 43. When described in detail, the protruding portion 49 extends upward from the rear end of the upper surface 44 of the duct 40.

The headlight unit 50 is attached to the stay 31 through an elastic member such as rubber. The headlight unit 50 is disposed apart from the duct 40 in the up-and-down direction and the right-and-left direction. The headlight unit 50 includes a headlight 52 and a control unit 53.

The headlight 52 overlaps the head pipe 12 in the vehicle front view. The headlight 52 employs a single light configuration and is disposed in the middle of the vehicle in the vehicle width direction. The headlight 52 is disposed inside the duct 40 and on a more rear side than the opening 42. The headlight 52 is disposed apart from the upper surface 44 and the lower surface 45 of the duct 40 at gaps in the up-and-down direction. The headlight 52 is disposed apart from the left and right lateral surfaces 46 and 47 of the duct 40 at gaps in the right-and-left direction. The headlight 52 is invisible in the vehicle side view. The headlight 52 is disposed on a more rear side than the aero-stabilizing member 60. The headlight 52 is disposed between the position lights 71 and 72 in the vehicle front view.

The headlight 52 includes a headlight bulb 52a and a lens 52b. The headlight bulb 52a includes, for instance, an LED (Light Emitting Diode) as a light source thereof. The lens 52b covers the headlight bulb 52a from front. The lens 52b is convexly curved toward the front in the vehicle side view.

The control unit 53 controls the headlight 52. The control unit 53 is electrically connected to the headlight 52 through a cable 55. The control unit 53 is disposed behind the protruding portion 49 of the duct 40. The control unit 53 is disposed directly above the headlight 52.

The aero-stabilizing member 60 stabilizes the traveling wind, flowing from ahead, to flow away from the head pipe 12 in the vehicle width direction. The aero-stabilizing member 60 is supported by the vehicle body frame 2, while being integrally movable with the headlight 52. The aero-stabilizing member 60 is attached to the headlight unit 50. The aero-stabilizing member 60 is disposed inside the duct 40 and on a more rear side than the opening 42. The aero-stabilizing member 60 is disposed apart from the duct 40 in the up-and-down direction and the right-and-left direction. When described in detail, the aero-stabilizing member 60 is disposed apart from the upper surface 44 and the lower surface 45 of the duct 40 at gaps in the up-and-down direction. The aero-stabilizing member 60 is disposed apart from the left lateral surface 46 and the right lateral surface 47 of the duct 40 at gaps in the right-and-left direction. The aero-stabilizing member 60 is invisible in the vehicle side view.

The aero-stabilizing member 60 is disposed in adjacent to the headlight 52 so as to laterally cover the headlight 52 from right and left. When described in detail, as shown close-up in FIG. 6, the aero-stabilizing member 60 includes a left wall portion 61 and a right wall portion 62. The left wall portion 61 laterally covers the headlight 52 from left. The left wall portion 61 is disposed apart from the left lateral surface 46 of the duct 40 in the right-and-left direction. The right wall portion 62 is disposed in opposition to the left wall portion 61 in the right-and-left direction and laterally covers the headlight 52 from right. The right wall portion 62 is disposed apart from the right lateral surface 47 of the duct 40 in the right-and-left direction.

Figure 6:
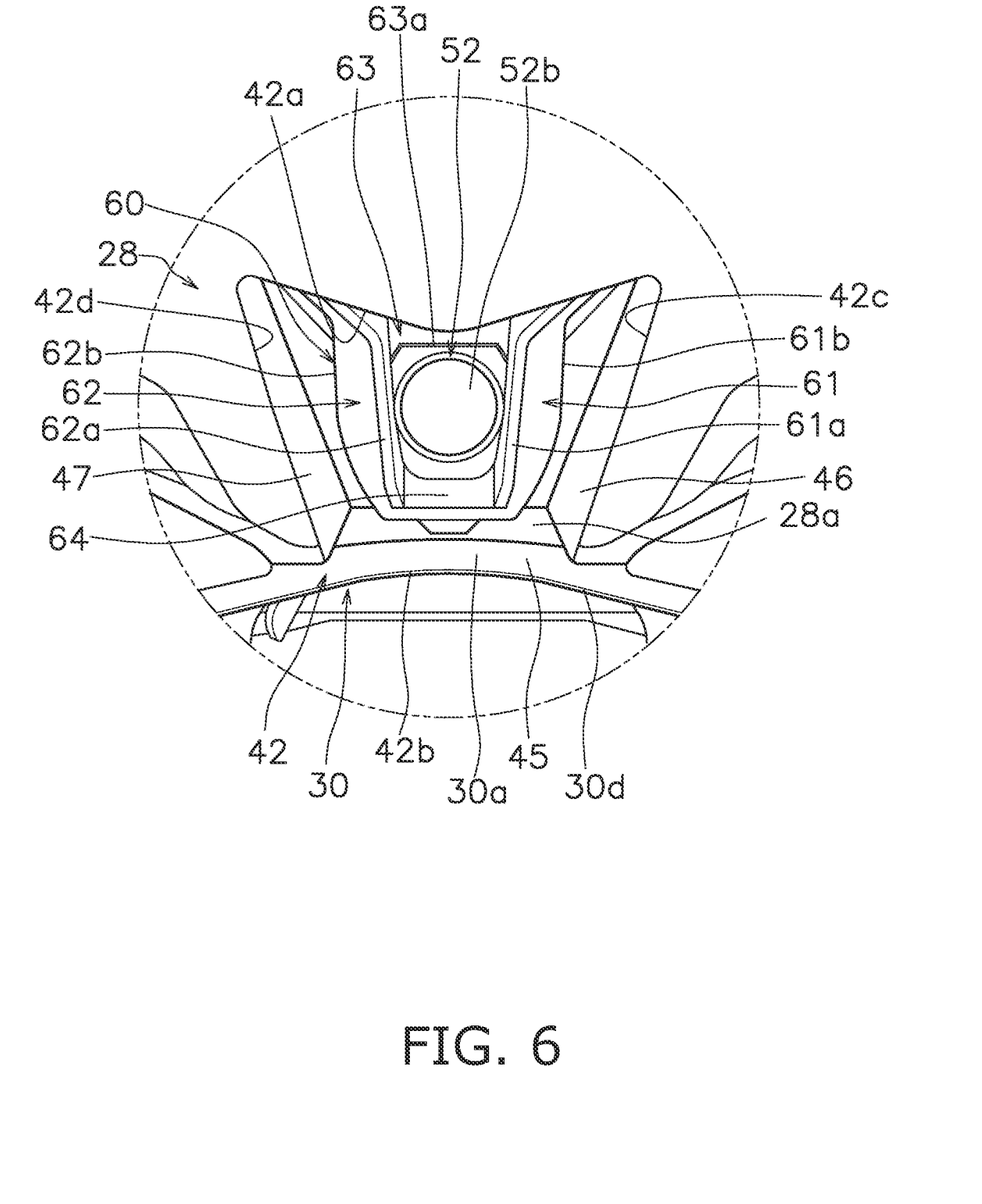
FIG. 6 is a front view of an opening and the surroundings thereof.

Each left/right wall portion 61, 62 protrudes to a more front side than the headlight 52. A front end 61a of the left wall portion 61 and a front end 62a of the right wall portion 62 are disposed on a more front side than the headlight 52. In each front end 61a, 62a of each left/right wall portion 61, 62, a lower portion thereof is disposed on a more inner side than an upper portion thereof in the vehicle width direction. In the left wall portion 61, the front end 61a is located closer to the middle of the vehicle than a rear end 61b in the vehicle width direction. In the right wall portion 62, the front end 62a is located closer to the middle of the vehicle than a rear end 62b in the vehicle width direction.

The aero-stabilizing member 60 includes a top wall portion 63 and a bottom wall portion 64. The top wall portion 63 is disposed in adjacent to the headlight 52 so as to cover the headlight 52 from above. As shown in FIG. 5, the top wall portion 63 is disposed apart from the upper surface 44 and the protruding portion 49 of the duct 40 in the up-and-down direction. The top wall portion 63 is disposed between the left wall portion 61 and the right wall portion 62. The top wall portion 63 is disposed on a more rear side than each left/right wall portion 61, 62. A front end 63a of the top wall portion 63 protrudes to a more front side than the headlight 52. The front end 63a of the top wall portion 63 is disposed on a lower side than the upper end 42a of the opening 42. The top wall portion 63 extends rearward and upward from the front toward the rear in the vehicle side view.

The bottom wall portion 64 is disposed in adjacent to the headlight 52 so as to cover the headlight 52 from below. The front end of the bottom wall portion 64 is disposed on a more rear side than the top wall portion 63. The bottom wall portion 64 overlaps the lens 52b of the headlight 52 in a plan view of the straddled vehicle. In the present preferred embodiment, the bottom wall portion 64 is disposed on a more rear side than the distal end of the lens 52b. The bottom wall portion 64 is disposed apart from the lower surface 45 of the duct 40 in the up-and-down direction.

The position lights 71 and 72 are disposed more apart from the middle of the vehicle than the opening 42 in the vehicle width direction. The position lights 71 and 72 are arranged side by side with the headlight 52 in the right-and-left direction in the vehicle front view. The position light 71 is disposed between the front cover 21 and the front side cover 22 in the vehicle front view. The position light 71 is disposed directly above the front end 22a of the front side cover 22. The position light 71 is supported by the cover body 28 of the front cover 21.

The position light 71 is shaped to be elongated in approximately a horizontal direction in the vehicle front view. The position light 71 is shaped to be elongated in approximately the horizontal direction in the vehicle side view as well. In the present preferred embodiment, the position light 71 extends upward and rearward from the front end thereof to the rear end thereof in the vehicle side view.

The position light 72 is shaped to be bilaterally symmetric to the position light 71. The position light 72 is disposed between the front cover 21 and the front side cover 23 in the vehicle front view.

Figure 7:
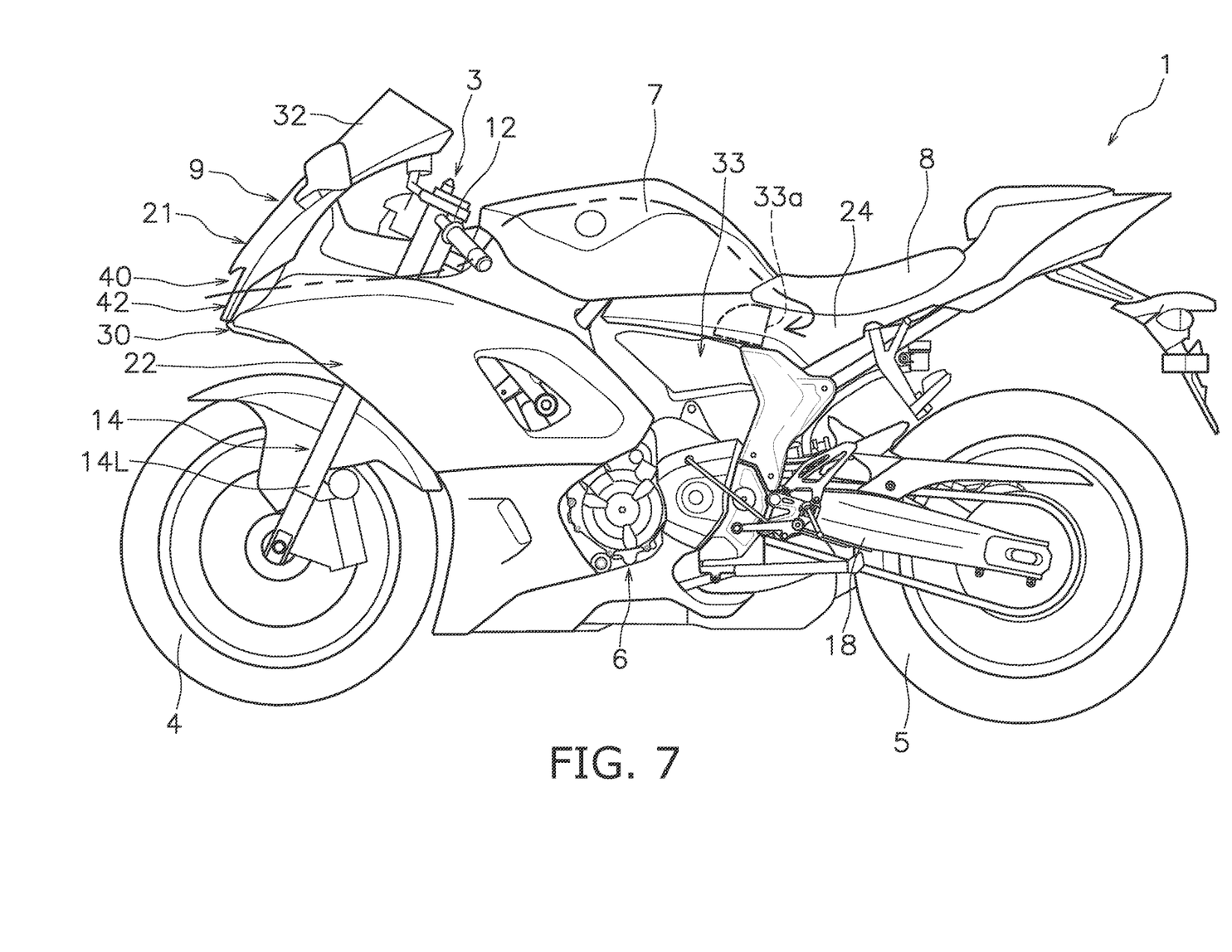
FIG. 7 is a diagram for explaining a flow of traveling wind.

Next, a flow of traveling wind taken in through the opening 42 into the duct 40 will be explained with reference to FIGS. 2 and 7. In FIGS. 2 and 7, the flow of traveling wind is depicted with dashed two-dotted line. As shown in FIG. 2, the traveling wind, taken in through the opening 42 into the duct 40, is stabilized to be directed to detour the head pipe 12 by the left and right wall portions 61 and 62 of the aero-stabilizing member 60 inside the duct 40, flows the lateral sides of the head pipe 12 and the tank support frame 13a, and reaches the air intake port 33a. Besides, as shown in FIG. 7, the traveling wind, taken in through the opening 42 into the duct 40, flows the lateral sides of the head pipe 12, flows through a gap between a tank body and a tank cover (both of which are not shown in the drawings) of the fuel tank 7, and reaches the air intake port 33a.

In the straddled vehicle 1 according to the present aspect, the headlight 52 is disposed inside the duct 40 and on a more rear side than the opening 42 configured to take in the traveling wind, flowing from ahead, into the duct 40. Because of this, the traveling wind, flowing from ahead, herein becomes more likely to be taken in through the opening 42 into the duct 40 than a configuration that the headlight 52 is disposed inside the duct 40 and on a more front side than at least a portion of the opening 42. Besides, the traveling wind, flowing through the duct 40, is stabilized to be directed to detour the head pipe 12 by the aero-stabilizing member 60. Hence, the traveling wind, flowing from ahead, can be efficiently led to flow rearward. Moreover, the aero-stabilizing member 60 is disposed in adjacent to the headlight 52 so as to laterally cover the headlight 52 from right and left. Hence, increase in leakage of light emitted from the headlight 52 can be inhibited by the aero-stabilizing member 60. Furthermore, the headlight 52 herein used employs a single light configuration. Hence, adjustment in direction and intensity of light is made more easily by the single headlight 52 than by a pair of right and left headlights.

One preferred embodiment of the present invention has been explained above. However, the present invention is not limited to the preferred embodiment described above, and a variety of changes can be made without departing from the gist of the present invention.

In the preferred embodiment described above, the front cover 21 includes the aero-stabilizing plate 30. However, the aero-stabilizing plate 30 may be omitted. In this case, for instance, the bottom surface 28a of the cover body 28 of the front cover 21 may be shaped to extend to a more front side than the headlight 52 such that the front end of the bottom surface 28a is provided as the lower end 42b of the opening 42.

The position lights 71 and 72 may be flashers, or alternatively, may be configured to function not only as position lights but also as flashers.

What is claimed is:

1. A straddled vehicle comprising:
a body frame including a head pipe;
a front cover disposed in front of the head pipe, the front cover having an opening formed therein at a middle of the straddled vehicle in a width direction thereof;
a duct disposed in front of the head pipe, the duct extending rearward from the opening in the front cover to form a traveling wind pathway for traveling wind flowing from ahead and taken in through the opening;
a headlight of a single light configuration, the headlight overlapping the head pipe in a front view of the straddled vehicle, the headlight being disposed inside the duct at the middle of the straddled vehicle in the width direction thereof, and further rearward than a front end of the duct, the headlight being disposed apart from the duct in both an up-and-down direction and a right-and-left direction; and
an aero-stabilizing member disposed inside the duct and laterally covering the headlight, the aero-stabilizing member being configured to direct the traveling wind flowing from ahead to flow away from the head pipe in the width direction of the straddled vehicle.

2. The straddled vehicle according to claim 1, wherein the headlight includes a headlight bulb and a lens covering the headlight from front,
the aero-stabilizing member includes a bottom wall portion disposed directly below the headlight, and
the bottom portion overlaps the lens in a plan view of the straddled vehicle.

3. The straddled vehicle according to claim 1 wherein the aero-stabilizing member is disposed further rearward than the front end of the duct.

4. The straddled vehicle according to claim 1, wherein
the aero-stabilizing member includes a left wall portion and a right wall portion, the left wall portion laterally covering the headlight from left, the right wall portion laterally covering the headlight from right, and
in the front view of the straddled vehicle, a front end of each of the left and right wall portions is located closer to the middle of the straddled vehicle in the width direction than a rear end of said each of the left and right wall portions.

5. The straddled vehicle according to claim 1, wherein
the aero-stabilizing member includes a top wall portion disposed directly above the headlight, and
a front end of the top wall portion protrudes further forward than the headlight.

6. The straddled vehicle according to claim 1, wherein the aero-stabilizing member is supported by the body frame and is movable with the headlight.

7. The straddled vehicle according to claim 1, wherein the aero-stabilizing member is disposed apart both from a lower surface of the duct and from an upper surface of the duct, with gaps therebetween in the up-and-down direction of the straddled vehicle.

8. The straddled vehicle according to claim 1, further comprising:
a control unit connected to the headlight and being configured to control the headlight, wherein
the duct further includes a protruding portion protruding upward in the up-and-down direction of the straddled vehicle, and
the control unit is disposed behind the protruding portion.

9. The straddled vehicle according to claim 1, further comprising:
a pair of position lights supported by the front cover, the pair of position lights being disposed more apart from the middle of the straddled vehicle in the width direction than the front end of the duct, the pair of position lights being arranged side by side with the headlight in the right-and-left direction in the front view of the straddled vehicle.

10. The straddled vehicle according to claim 9, wherein each of the pair of position lights is shaped to be elongated in a substantially horizontal direction in the front view of the straddled vehicle.

11. A straddled vehicle, comprising:
a body frame including a head pipe;
a front cover disposed in front of the head pipe, the front cover having an opening formed therein at a middle of the straddled vehicle in a width direction thereof;
a duct disposed in front of the head pipe, the duct extending rearward from the opening in the front cover to form a traveling wind pathway for traveling wind flowing from ahead and taken in through the opening;
a headlight of a single light configuration, the headlight overlapping the head pipe in a front view of the straddled vehicle, the headlight being disposed inside the duct at the middle of the straddled vehicle in the width direction thereof, and further rearward than a front end of the duct; and
an aero-stabilizing member disposed inside the duct and laterally covering the headlight, the aero-stabilizing member being configured to direct the traveling wind flowing from ahead to flow away from the head pipe in the width direction of the straddled vehicle, wherein:

the aero-stabilizing member includes a left wall portion and a right wall portion, the left wall portion laterally covering the headlight from left, the right wall portion laterally covering the headlight from right, each of the left wall portion and the right wall portion protrudes to a more front side than the headlight, and each of the left wall portion and the right wall portion is disposed apart from the duct in the width direction of the straddled vehicle.

12. A straddled vehicle, comprising:
a body frame including a head pipe;
a front cover disposed in front of the head pipe, the front cover having an opening formed therein at a middle of the straddled vehicle in a width direction thereof;
a duct disposed in front of the head pipe, the duct extending rearward from the opening in the front cover to form a traveling wind pathway for traveling wind flowing from ahead and taken in through the opening;
a headlight of a single light configuration, the headlight overlapping the head pipe in a front view of the straddled vehicle, the headlight being disposed inside the duct at the middle of the straddled vehicle in the width direction thereof, and further rearward than a front end of the duct; and
an aero-stabilizing member disposed inside the duct and laterally covering the headlight, the aero-stabilizing member being configured to direct the traveling wind flowing from ahead to flow away from the head pipe in the width direction of the straddled vehicle, wherein
the headlight is invisible when viewed from a side of the straddled vehicle.

* * * * *